(12) United States Patent
Kusano

(10) Patent No.: US 9,787,439 B2
(45) Date of Patent: Oct. 10, 2017

(54) DATA TRANSMITTING METHOD, DATA RECEIVING APPARATUS, DATA TRANSMITTING APPARATUS, BASE STATION, MOBILE STATION, DATA TRANSMITTING/RECEIVING APPARATUS, AND MOBILE COMMUNICATION SYSTEM

(71) Applicant: MITSUBISHI ELECTRIC CORPORATION, Chiyoda-ku (JP)

(72) Inventor: Masaaki Kusano, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/120,677

(22) PCT Filed: Nov. 28, 2014

(86) PCT No.: PCT/JP2014/081615
§ 371 (c)(1),
(2) Date: Aug. 22, 2016

(87) PCT Pub. No.: WO2015/151335
PCT Pub. Date: Oct. 8, 2015

(65) Prior Publication Data
US 2017/0126366 A1 May 4, 2017

(30) Foreign Application Priority Data
Apr. 4, 2014 (JP) .................................. 2014-077922

(51) Int. Cl.
*H04L 1/18* (2006.01)
*H04W 24/08* (2009.01)

(52) U.S. Cl.
CPC .......... *H04L 1/1816* (2013.01); *H04L 1/1822* (2013.01); *H04W 24/08* (2013.01)

(58) Field of Classification Search
None
See application file for complete search history.

(56) References Cited

U.S. PATENT DOCUMENTS

2002/0071407 A1* 6/2002 Koo ..................... H04B 7/2637
370/335
2004/0208160 A1* 10/2004 Petrovic ................ H04L 1/1835
370/350
(Continued)

FOREIGN PATENT DOCUMENTS

JP 2010/503362 A 1/2010
JP 2011-511584 A 4/2011
(Continued)

OTHER PUBLICATIONS

"3GPP TS 36.331 V11.6.0 3rd Generation Partnership Project; Technical Specification Group Radio Access Network; Evolved Universal Terrestrial Radio Access (E-UTRA); Radio Resource Control (RRC); Protocol specification (Release 11)," 2013, 349 pages.
(Continued)

*Primary Examiner* — Kodzovi Acolatse
(74) *Attorney, Agent, or Firm* — Oblon, McClelland, Maier & Neustadt, L.L.P.

(57) ABSTRACT

A data transmitting method applied with HARQ for transmitting data from a data transmission side to a data reception side. The data transmission side allocates a process, which is a transmission unit of the same data, to new transmission data and transmits the new transmission data, cyclically continues to transmit the same data of the new transmission data or an error correction code of the same data in a process same as the process until generation of another new transmission data, and allocates, when another new transmission data is generated, the process of the cyclically continued transmission to the other new transmission data and cycli-
(Continued)

cally transmits the other new transmission data. The data reception side performs data combination by the HARQ using the received data to normally receive data and detect a data error or data non-reception and monitors a communication connection state with the data transmission side.

13 Claims, 9 Drawing Sheets

(56) References Cited

U.S. PATENT DOCUMENTS

| | | | |
|---|---|---|---|
| 2008/0130560 A1 | 6/2008 | Khandekar et al. | |
| 2008/0235552 A1 | 9/2008 | Tsai et al. | |
| 2009/0103500 A1 | 4/2009 | Malkamaki et al. | |
| 2009/0197589 A1 | 8/2009 | Kitazoe | |
| 2009/0259910 A1* | 10/2009 | Lee | H04L 1/18 714/748 |
| 2010/0085927 A1* | 4/2010 | Torsner | H04L 1/1822 370/329 |
| 2010/0254275 A1 | 10/2010 | Kang et al. | |
| 2012/0327828 A1* | 12/2012 | Kawasaki | H04L 1/1621 370/310 |
| 2014/0204831 A1* | 7/2014 | Kim | H04W 4/005 370/312 |

FOREIGN PATENT DOCUMENTS

| | | |
|---|---|---|
| WO | 2008/116198 A2 | 9/2008 |
| WO | WO 2013/138779 A1 | 9/2013 |

OTHER PUBLICATIONS

"3GPP TS 36.321 V12.0.0 3rd Generation Partnership Project; Technical Specification Group Radio Access Network; Evolved Universal Terrestrial Radio Access (E-UTRA); Medium Access Control (MAC) protocol specification (Release 12)," 2013, 57 pages.
International Search Report and Written Opinion dated Mar. 3, 2015 in PCTJP2014/081615 Filed Nov. 28, 2014.
The Partial Supplementary European Search Report dated Mar. 28, 2017 in Patent Application No. 14888405.9.
Extended European Search Report dated Jun. 30, 2017 in Patent Application No. 14888405.9.

* cited by examiner

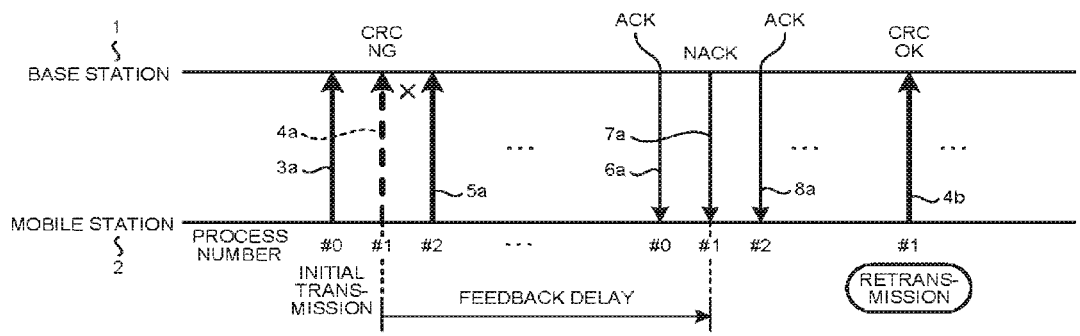
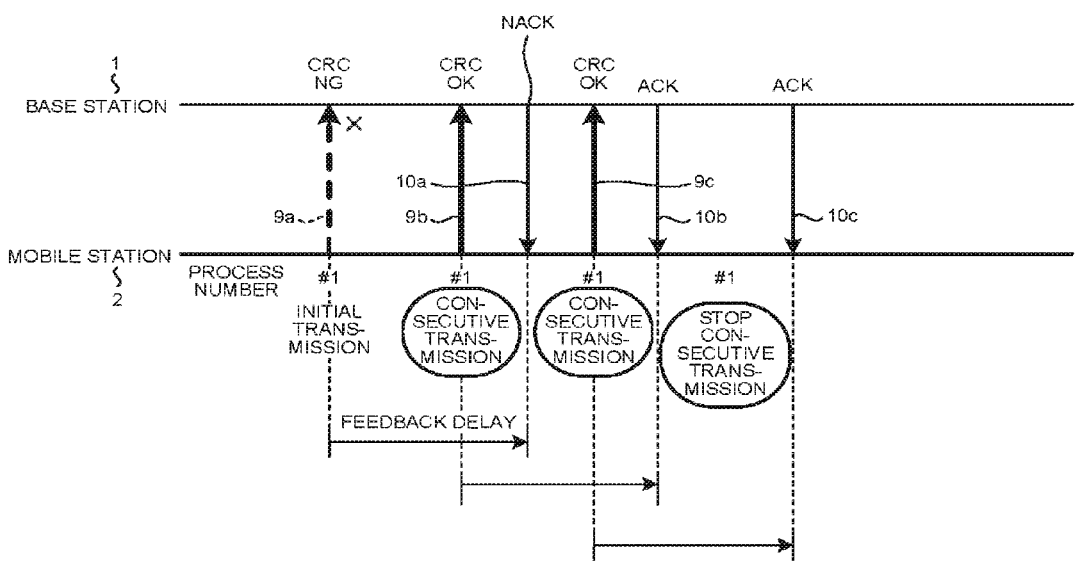

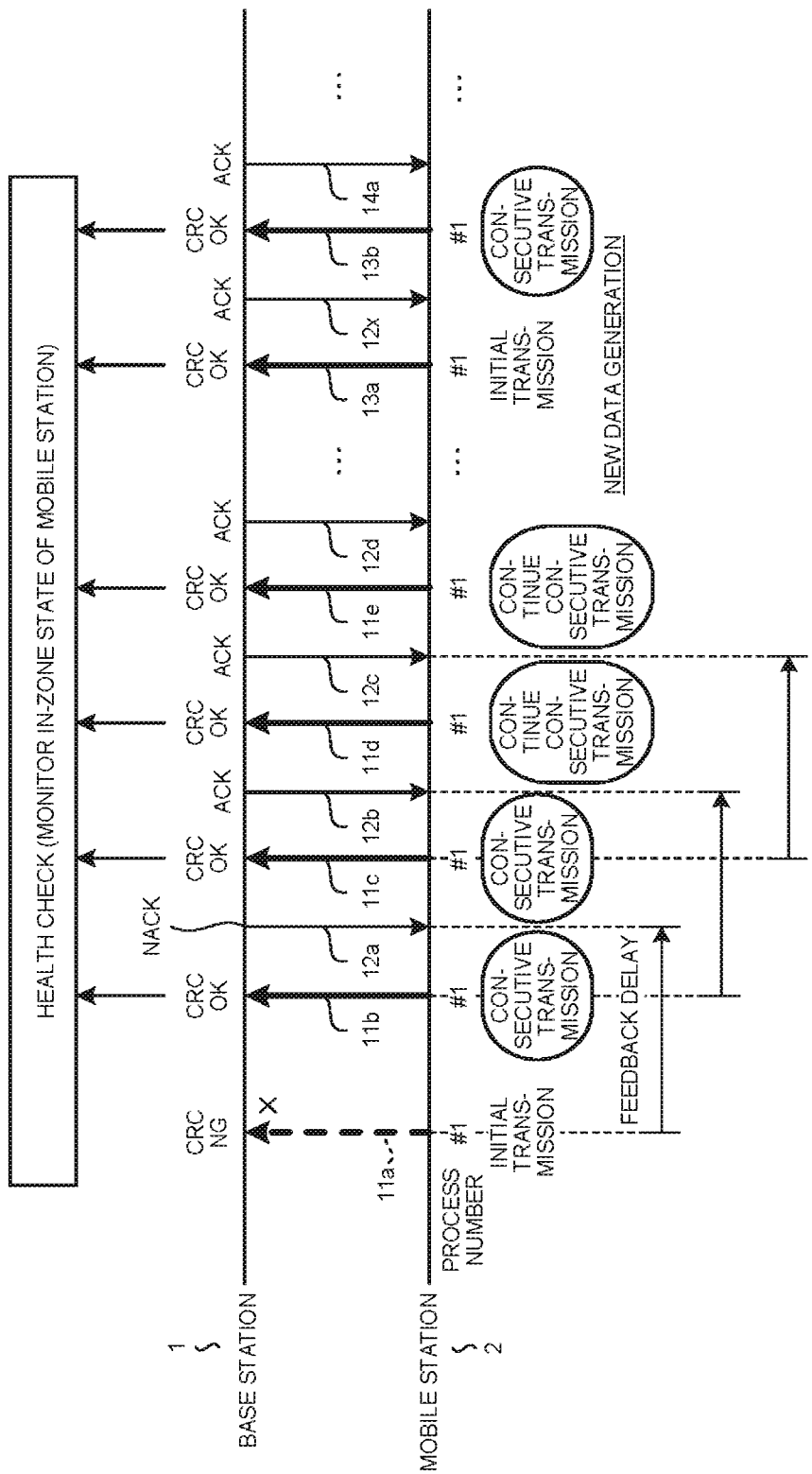

FIG.5

| LOGICAL CHANNEL NUMBER | QoS |
|---|---|
| #0 | QoS#0(DATA TRANSMITTING METHOD #3) |
| #1 | QoS#3(DATA TRANSMITTING METHOD #1) |
| #2 | – |
| #3 | – |
| #4 | – |
| #5 | – |
| ⋮ | ⋮ |

| LOGICAL CHANNEL NUMBER | ALLOCATED PROCESS NUMBER |
|---|---|
| #0 | #1 |
| #1 | #5 |
| #2 | – |
| #3 | – |
| #4 | – |
| #5 | – |
| ⋮ | ⋮ |

| LOGICAL CHANNEL NUMBER | PROCESS STATE |
|---|---|
| #0 | FREE |
| #1 | DATA TRANSMITTING METHOD #3 |
| #2 | FREE |
| #3 | FREE |
| #4 | FREE |
| #5 | DATA TRANSMITTING METHOD #1 |
| ⋮ | ⋮ |

DATA TRANSMITTING METHOD, DATA RECEIVING APPARATUS, DATA TRANSMITTING APPARATUS, BASE STATION, MOBILE STATION, DATA TRANSMITTING/RECEIVING APPARATUS, AND MOBILE COMMUNICATION SYSTEM

FIELD

The present invention relates to a data transmitting method, a data receiving apparatus, a data transmitting apparatus, a base station, a mobile station, a data transmitting/receiving apparatus, and a mobile communication system.

BACKGROUND

In an LTE (Long Term Evolution) cellular mobile communication system, error correction by HARQ (Hybrid ARQ) has been applied. The error correction by the HARQ has been applied to not only data transmission of bidirectional communication between a base station and a mobile station but also data transmission of unidirectional communication for notification information or the like. A delivery confirmation is absent concerning the data transmission of the unidirectional communication. Therefore, the same data or an error correction code generated from the same data is continuously transmitted, that is, consecutively transmitted, and soft decision combination is performed to perform error correction on a data receiving side.

In the cellular mobile communication system, a non-communication state with the mobile station is monitored and, when a fixed time or more has elapsed, connection is disconnected to avoid radio resources including context information and management information for the connected mobile state, which are managed in the base station, being unnecessarily continued to be secured and enable the radio resources to be allocated to other mobile stations. In the LTE standard specified by 3GPP (3rd Generation Partnership Project), it is not specified that the base station performs non-communication monitoring, which is monitoring of a non-communication state in a radio section. However, for example, Non-Patent Literature 1 discloses non-communication monitoring performed using "ue-InactiveTime" (see P306 to 307).

CITATION LIST

Non-Patent Literature

Non-Patent Literature 1: 3GPP TS36.331 V12.0.0 (2013-12)

SUMMARY

Technical Problem

However, according to the related art, relevance to the HARQ and the consecutive transmission is not considered concerning the non-communication monitoring. In the non-communication monitoring explained above, connection to a mobile station outside the zone or a mobile station having no data to be transmitted is actively disconnected. It is possible to statistically increase the number of mobile stations present in the zone in a wide range around the base station. However, the mobile station has to be connected again when data to be transmitted is generated in the mobile station. Therefore, there is a problem in that a connection delay occurs.

On the other hand, in road-to-vehicle communication or vehicle-to-vehicle communication, which is mobile communication applied to a train or automobile traffic system, when connection to a base station is disconnected while a mobile station equivalent to a radio apparatus mounted on a train or an automobile is present in the zone, it is likely that an accident occurs because arrival of brake control information, which is an example of control information for controlling the mobile station on a real time basis, is delayed or, when the number of mobile stations actually present in the zone cannot be grasped and it is attempted to connect the mobile station again, it is likely that a maximum number of mobile stations to be accommodated is exceeded. Therefore, there is a problem in that control of the mobile station is disabled.

The present invention has been devised in view of the above and an object of the present invention is to obtain a data transmitting method that can prevent, without causing a connection delay, control of a mobile station from being disabled.

Solution to Problem

To solve the problems and achieve the object, the present invention provides a data transmitting method applied with HARQ for transmitting data from a data transmission side to a data reception side. The data transmission side allocates a process, which is a transmission unit of same data, to new transmission data and transmits the new transmission data, cyclically continues to transmit the same data of the new transmission data or an error correction code of the same data in a process same as the process until generation of another new transmission data, and allocates, when another new transmission data is generated, the process of the cyclically continued transmission to the other new transmission data and cyclically transmits the other new transmission data. The data reception side performs data combination by the HARQ using the received data to normally receive data and detect a data error or data non-reception and monitors a communication connection state with the data transmission side using the received data.

Advantageous Effects of Invention

According to the present invention, there is an effect that it is possible to prevent, without causing a connection delay, control of a mobile station from being disabled.

BRIEF DESCRIPTION OF DRAWINGS

FIG. 1 is a diagram showing a data transmitting method by a basic operation of HARQ.

FIG. 2 is a diagram showing a data transmitting method by an operation for consecutively transmitting data.

FIG. 3 is a diagram showing a data transmitting method according to an embodiment.

FIG. 5 is a diagram showing an example of a QoS setting table according to the embodiment.

FIG. 6 is a diagram showing an example of a process correspondence table according to the embodiment.

FIG. 7 is a diagram showing an example of a process state table according to the embodiment.

DESCRIPTION OF EMBODIMENTS

Figure 4:
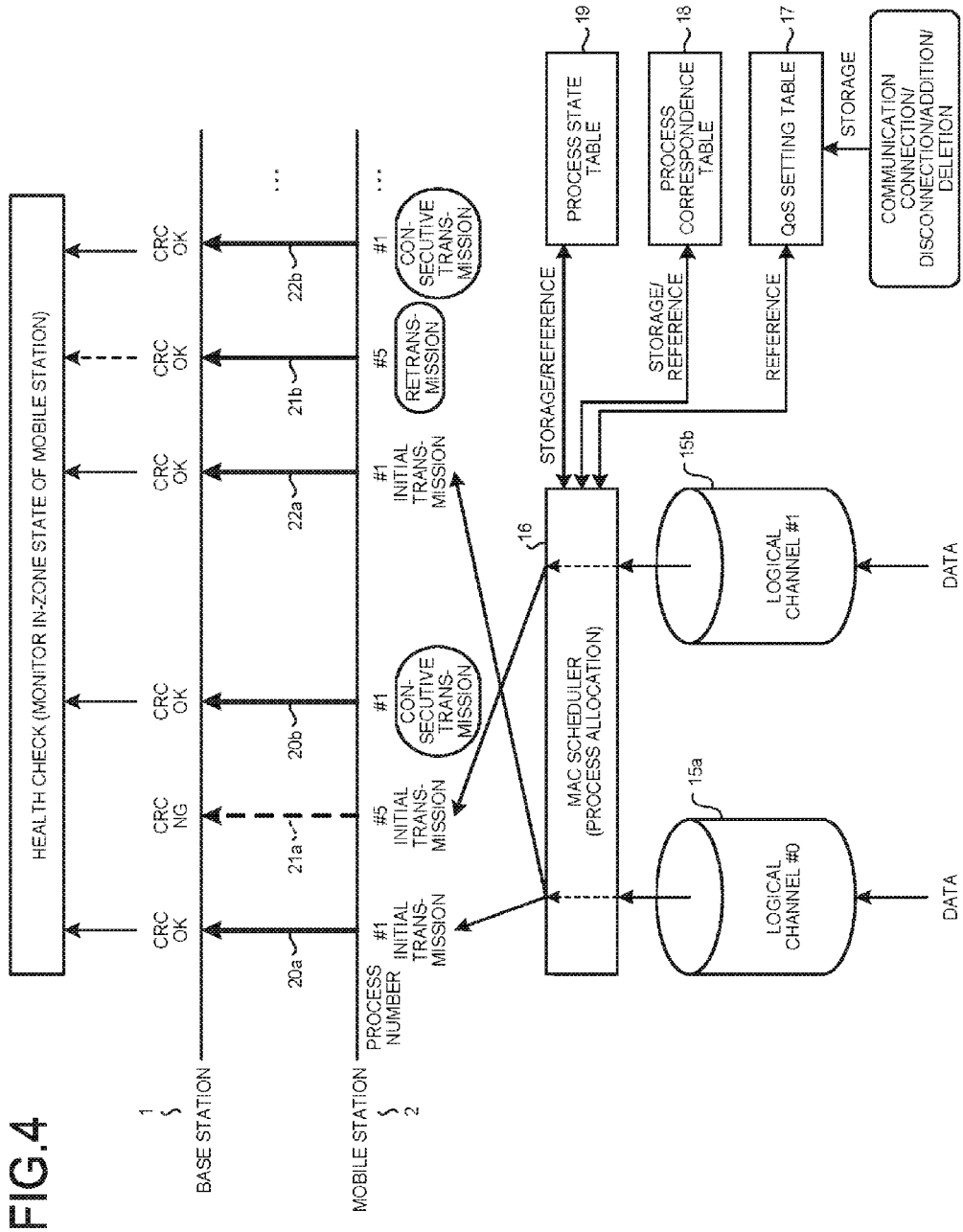
FIG. 4 is a diagram showing a data transmitting method applied when there are a plurality of kinds of QoS (Quality of Service) of data to be transmitted according to the embodiment.

An embodiment of a data transmitting method according to the present invention is explained in detail below with reference to the drawings. Note that the present invention is not limited by the embodiment.

Embodiment

FIG. 1 is a diagram showing a data transmitting method by a basic operation of HARQ. The HARQ is a data transmitting method widely used in a cellular mobile communication system and mainly applied to unicast transmission to a specific destination at the time when high-rate data transmission is performed.

A base station 1 receives data from a mobile station 2, inspects the received data with CRC (Cyclic Redundancy Check), and transmits ACK or NACK, which is a delivery confirmation, to the mobile station 2. When transmitting data 3*a*, 4*a*, and 5*a* different from one another, the mobile station 2 allocates the data to different HARQ processes and sequentially transmits the data for each of time slots subjected to time division. Note that the HARQ process is hereinafter simply referred to as "process". In this embodiment, to avoid collision with data transmitted by other mobile stations, the base station 1 performs management of the time slots, which are radio resources. The base station 1 allocates the time slots in advance before the mobile station 2 transmits the data.

When the data is transmitted using processes #0, #1, and #2 and, for example, an error occurs in the data 4*a* of the process #1 as shown in FIG. 1, the base station 1 transmits a NACK response 7*a*, which is a delivery confirmation of the process #1. Note that the error includes non-reception. Because the data 3*a* and 5*a* of the processes #0 and #2 are normally received by the base station 1, the base station 1 transmits ACK responses 6*a* and 8*a*, which are delivery confirmations of the processes #0 and #2. Note that, in an example explained here, when an error occurs in data received by the base station 1, the base station 1 transmits a NACK response. However, the present invention is not limited to this. The mobile station 2 can determine that a response of a process in which an ACK response is not received is a NACK response.

When receiving the NACK response 7*a* of the process #1, the mobile station 2 retransmits the data of the process #1 or transmits an error correction code and combines the error correction code with the data 4*a* including the error received by the base station 1 before. Then, the data of the process #1 is normally received. In FIG. 1, retransmission data 4*b* is shown. In the data transmitting method for performing the retransmission after receiving the NACK response in this way, there is a problem in that a feedback delay occurs because the mobile station 2 waits for the NACK response and a large delay occurs before the base station 1 normally receives the data through the retransmission.

Note that a process number for identifying a process is transmitted as control information together with data to be transmitted or is determined in association with a time slot for transmitting the data. A sequence number indicating whether, even in the same process, data is different or data is the same is transmitted as control information together with data transmission. A reception side determines according to a combination of the process number and the sequence number of the data whether the received data is to be combined. Such a determination method for data combination is an operation generally performed in the HARQ. Therefore, although the same method is used in a data transmitting method explained blow, explanation of the method is omitted.

FIG. 2 is a diagram showing a data transmitting method by an operation for consecutively transmitting data. The data transmitting method shown in FIG. 2 is applicable to unicast, broadcast, or multicast. In FIG. 2, as in FIG. 1, the mobile station 2 transmits data and the base station 1 transmits a delivery confirmation. For simplification, data transmission in the process #1 is explained.

In FIG. 2, as in FIG. 1, when an error occurs in data 9*a* when the mobile station 2 transmits the data 9*a* in the process #1, the base station 1 transmits a NACK response 10*a*. However, in FIG. 2, the mobile station 2 consecutively transmits the data of the process #1 or consecutive transmission data 9*b*, which is an error correction code, before receiving the NAC response 10*a*. Therefore, the base station 1 can combine the data 9*a* of the process #1 and the error correction code and can normally receive data in time shorter than a feedback delay. Note that, here, the number of times of consecutive transmission within the feedback delay is once. However, the number of times of consecutive transmission within the feedback delay is not limited to this and can be a plurality of times.

The mobile station 2 cyclically continues the consecutive transmission until receiving an ACK response 10*b* concerning the process #1 and consecutively transmits the data of the process #1 or consecutive transmission data 9*c*, which is an error correction code. However, when the ACK response 10*b* is received or the number of times of transmission reaches a maximum number of times of the consecutive transmission set in advance, the mobile station 2 stops the consecutive transmission in the process. Note that the ACK response 10*c* is a delivery confirmation for the consecutive transmission data 9*c*. The mobile station 2 does not perform data transmission in the process #1 before the process #1 is allocated according to generation of new data. According to the data transmitting method for performing the consecutive transmission shown in FIG. 2, it is possible to use a combination function of the HARQ without a feedback delay. Therefore, the data transmitting method shown in FIG. 2 is suitable for data transmission in which a low rate and a real time property are required.

FIG. 3 is a diagram showing an embodiment of a data transmitting method according to the present invention. The data transmitting method shown in FIG. 3 is a data transmitting method in which data consecutive transmission and health check are associated. In FIG. 3, as in FIG. 2, the mobile station 2 transmits data and the base station 1 transmits a delivery confirmation. Data transmission of the process #1 is explained. Concerning the number of processes to be simultaneously used, a plurality of processes can be used according to a new data generation frequency. A maximum number of usable processes is determined as quality of service (QoS) of a logical channel that performs communication during connection or during addition of communication. That is, a maximum number of processes simultaneously usable for one logical channel is limited. The maximum number of processes is set larger for a logical channel in which the new data generation frequency is higher.

When the mobile station 2 transmits data 11a in the process #1 and an error occurs, the base station 1 transmits a NACK response 12a. However, the mobile station 2 consecutively transmits data of the process #1 or consecutive transmission data 11b, which is an error correction code, before receiving the NACK response 12a. Therefore, as in FIG. 2, the base station 1 can normally receive data in time shorter than a feedback delay. Note that, in FIG. 3, as in FIG. 2, the number of times of the consecutive transmission within the feedback delay can be a plurality of times.

Even when receiving an ACK response 12b as a delivery confirmation concerning the consecutive transmission data 11b, the mobile station 2 cyclically continues consecutive transmission until new data 13a allocated to the process #1 is generated. Note that ACK responses 12c and 12d are respectively delivery confirmations of consecutive transmission data 11c and 11d. A delivery confirmation of consecutive transmission data 11e is omitted in the figure. An ACK response 12x is a last delivery confirmation concerning consecutive transmission data of the data 11a. When new data 13a and 13b are transmitted in the same process number, the new data 13a and 13b are transmitted with sequence numbers changed. Thereafter, similarly, the consecutive transmission is continued until the next new data allocated to the process #1 is generated. Therefore, even when a generation interval of new data in the mobile station 2 is not fixed, the base station 1 can cyclically and continuously receive data from the mobile station 2. Note that an ACK response 14a is a delivery confirmation of the data 13a.

Fluctuation occurs in the number of times of consecutive transmission according to a generation interval of data. However, in the mobile station 2, which is a data transmission side, the number of times of transmission of the same data including initial transmission is retained as a parameter "minimum number of times of transmission". Note that the same data can be an error correction code. The minimum number of times of transmission is a parameter that is set in advance and can be changed during communication. When the minimum number of times of transmission is "1", radio transmission is performed at least once for generation of one new data. When the minimum number of times of transmission is "0", when new data is continuously generated in shorter time than a consecutive transmission interval, the new data generated earlier is discarded without being transmitted by radio and the new data generated immediately after the new data is transmitted by radio.

In this embodiment, because the mobile station 2 continues the consecutive transmission even when receiving ACK, the base station 1 can receive consecutive transmission data even when a delivery confirmation is erroneously determined, that is, a NACK response is erroneously determined as an ACK response. Therefore, it is possible to perform high-quality data transmission.

Note that, in the above explanation, the mobile station 2 performs the consecutive transmission before receiving a delivery confirmation. However, the present invention is not limited to this. In the case of communication in which a transmission delay is allowed in an environment in which an error of data occurs, the mobile station 2 can perform the consecutive transmission after receiving the delivery confirmation.

In the above explanation, the base station 1, which receives the data, transmits the delivery confirmation. However, the data transmitting method can be simplified not to transmit the delivery confirmation.

On the other hand, as explained above, the base station 1 performs health check of the mobile station 2 using high-quality and cyclically received data. The health check is a function for monitoring an in-zone state of the mobile station 2 and maintaining a communication connection state.

When receiving consecutive transmission data within a fixed period, the base station 1 maintains the communication connection state with the mobile station 2. Conversely, when a state in which data cannot be received from the mobile station 2 continues for the fixed period or more, the base station 1 determines that the mobile station 2 has shifted to the outside of the zone of the base station 1 or the mobile station 2 has fallen into a situation in which the mobile station 2 cannot perform communication. The base station 1 disconnects the communication connection state with the mobile station 2. Control for disconnecting the communication connection state can be performed by a host apparatus connected to the base station 1. When the control for disconnecting the communication connection state is performed by the host apparatus of the base station 1, the base station 1 notifies the host apparatus that communication with the mobile station 2 cannot be performed and waits for a communication disconnection instruction from the host apparatus.

As explained above, in this embodiment, because the health check is performed using the high-quality data transmission, it is possible to perform highly reliable maintenance and management of a communication connection state. Because transmission reliability of data used for the health check is higher as the number of processes to be simultaneously used is larger, a maximum number of processes simultaneously used for data transmission is not determined according to only the new data generation frequency as explained above and is increased according to requested reliability of communication connection maintenance. Note that the maximum number of usable processes is determined as QoS during connection or during addition of communication.

FIG. 4 is a diagram showing a data transmitting method applied when there are a plurality of kinds of QoS of data to be transmitted. In connection-type communication, in general, the mobile station 2 is capable of simultaneously performing a plurality of kinds of communication. QoS is determined for each of logical channels equivalent to a communication unit. Information indicating to which QoS the logical channels belong is determined during connection or during addition of communication. Data transmission associated with the QoS is performed for each of the logical channels. In a connectionless-type communication, QoS is given for each of data. However, in the connection-type communication, similarly, QoS is uniquely determined for data belonging to one logical channel. Therefore, the logical channels are used in the following explanation.

In FIG. 4, for simplification, a data transmitting method applied when data of two kinds of QoS are mixed is shown. When communication of a "logical channel #0" 15a and a "logical channel #1" 15b is connected or added, kinds of QoS corresponding to the logical channels are stored in a QoS setting table 17.

FIG. 5 is a diagram showing an example of the QoS setting table. In this embodiment, one transmitting method is uniquely determined in advance for one kind of QoS. Data transmitting methods for the logical channels are uniquely determined by referring to the QoS setting table 17. For example, as shown in FIG. 5, a data transmitting method #3, which is the data transmitting method in this embodiment shown in FIG. 3, is applied to the logical channel #0 and retransmission, which is a data transmitting method #1, is applied to the logical channel #1. Note that a data transmitting method #2, which is the data transmitting method shown in FIG. 2, can be applied.

In FIG. 4, a MAC scheduler 16 allocates processes to data transmitted in the logical channels and transmits the data to time-division time slots. When new data of the "logical channel #0" 15a is generated, the MAC scheduler 16 determines referring to the QoS setting table 17 that the new data is transmitted by the data transmitting method #3. In the data transmitting method #3, a process in use, in which the consecutive transmission is continued as shown in FIG. 3, is updated and used. Therefore, a process in used in the logical channel #0 is checked in a process correspondence table 18.

FIG. 6 is a diagram showing an example of the process correspondence table. In an initial state, there is no process allocated to all the logical channels. Therefore, processes are allocated anew. As the allocation of the processes, processes in a free state are allocated with reference to a process state table 19. The process #1 is allocated in FIG. 4. A process number corresponding to the logical channel #0 is stored in the process correspondence table 18. Use of the process #1 for the data transmitting method #3 is stored in the process state table 19. FIG. 7 is a diagram showing an example of the process state table.

Thereafter, the MAC scheduler 16 consecutively transmits data of the logical channel #0 in the data transmitting method #3. The data to be consecutively transmitted is data 20a and 20b. Note that, in FIG. 4, for simplification, a delivery confirmation transmitted by the base station 1 is omitted. When new data of the logical channel #1 is generated while the data of the logical channel #0 is consecutively transmitted, as explained above, the MAC scheduler 16 refers to the QoS setting table 17, updates the process correspondence table 18 and the process state table 19, and transmits data 21a in the data transmitting method #1. It is assumed that a process #5 is allocated to the logical channel #1. Note that the tables shown in FIG. 5, FIG. 6, and FIG. 7 show a storage state at this point in time.

When an error occurs in the data 21a and the mobile station 2 receives a NACK response, the mobile station 2 refers to the process state table 19. Because the data transmitting method #1 is applied to the process #5, the mobile station 2 retransmits the data 21a as data 21b in the data transmitting method #1. When receiving an ACK response to the data 21b, the mobile station 2 deletes information concerning the process #5 from the process correspondence table 18 and the process state table 19 and changes the process #5 to a free state. Further, when another new data is generated in the logical channel #0 while the data of the logical channel #0 is consecutively transmitted in the process #1, the MAC scheduler 16 refers to the QoS setting table 17 and the process correspondence table 18. Because the data transmitting method #3 is applied in the process #1 in the logical channel #0, the MAC scheduler 16 consecutively transmits new data, sequence numbers of which are changed, as data 22a and 22b instead of the data being consecutively transmitted.

The base station 1 performs health check of the mobile station 2 according to the received data. The health check can be performed on all the received data. However, when the data transmitting method #3 is applied, if the health check is performed using only data of the data transmitting method #3, it is possible to reduce a load on health check processing of the base station 1 without excessively performing the health check. In this case, if a table similar to the QoS setting table 17 is created during connection or during addition of communication in the base station 1, it is possible to discriminate referring to a logical channel given to the received data that the received data is data of the data transmitting method #3. In the data transmitting method #3 of the logical channel #0, a maximum number of usable processes is set to "1". It is seen that the number of processes has reached the maximum number of usable processes at a point in time when the process correspondence table 18 is referred to. Therefore, the process correspondence table 18 and the process state table 19 are not updated. When there are a plurality of maximum numbers of usable processes and, for example, two processes are usable, because it is possible to apply a process anew, another process is applied and the consecutive transmission is started. Thereafter, the allocated two processes are sequentially applied every time new data is generated. The consecutive transmission of the data transmitting method #3 is continued in parallel in the two processes.

According to the data transmitting method #1 and the data transmitting method #2, which are the data transmitting methods shown in FIG. 1 and FIG. 2, when an ACK response is received for transmitted data or the number of times of transmission reaches the maximum number of times of transmission, the data transmission is stopped. Therefore, a non-communication section occurs between the base station 1 and the mobile station 2 when new data is not continuously generated. In a mobile communication system in which health check is necessary, the base station 1 performs health check of the mobile station 2 in such a non-communication section. Therefore, transmission of a health check packet, which is control data for health check, is necessary.

Figure 8:
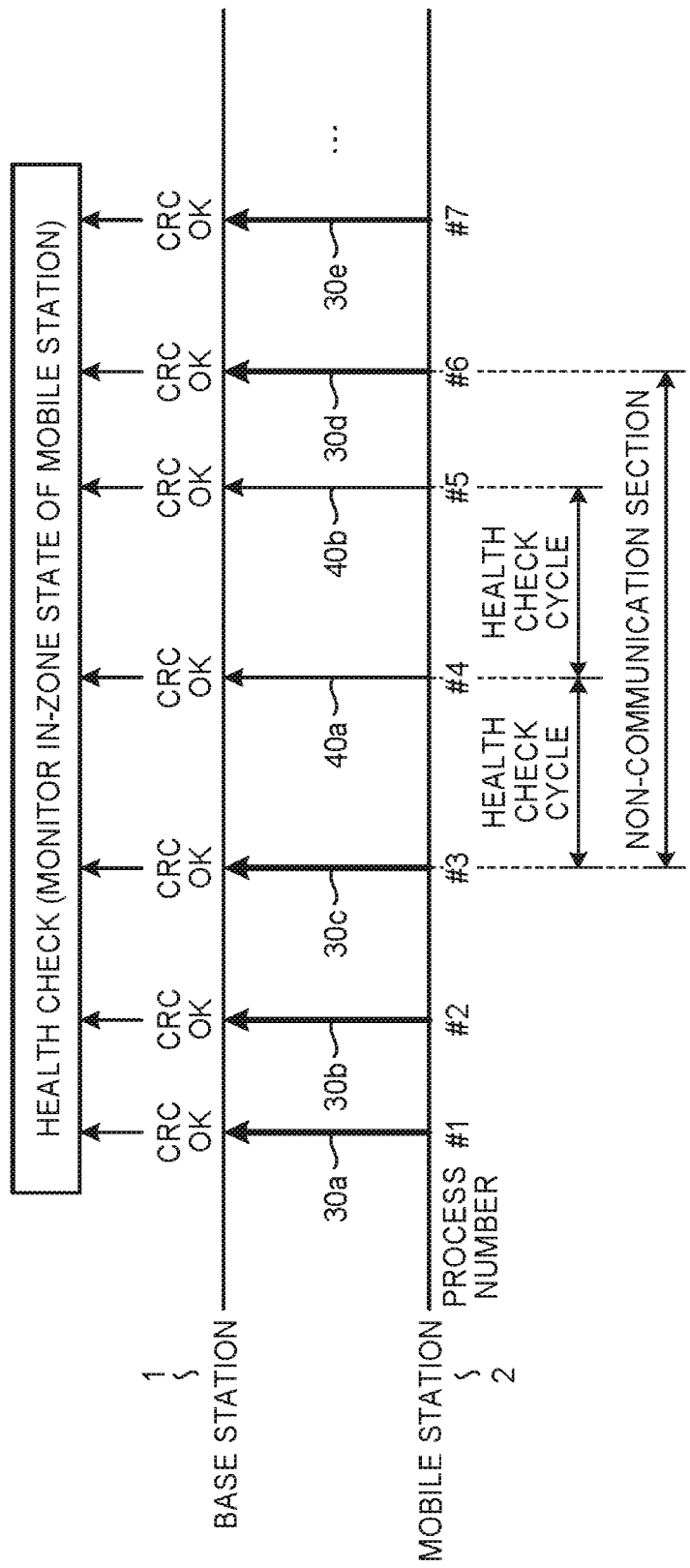
FIG. 8 is a diagram showing an operation of health check in a non-communication section performed when the data transmitting method shown in FIG. 1 or FIG. 2 according to the embodiment is applied.

FIG. 8 is a diagram showing an operation in performing health check in a non-communication section when the data transmitting method #1 or the data transmitting method #2 is applied. When the data transmitting method #1 and the data transmitting method #2 are mixed, similarly, the health check is performed as shown in FIG. 8. In other words, FIG. 8 is a diagram showing the operation of the health check performed when the data transmitting method #3, which is the data transmitting method in this embodiment shown in FIG. 3, is not applied. Note that, in FIG. 8, for simplification, a delivery confirmation for data reception is omitted.

In FIG. 8, data 30a to 30e are data to be transmitted from the mobile station 2 to the base station 1. For example, when a non-communication section continues after the data 30c is transmitted, the mobile station 2 transmits a health check packet 40a after a health check cycle determined in advance. Thereafter, the mobile station 2 transmits a health check packet 40b after the health check cycle. The mobile station 2 continues the transmission of the health check packets until transmission of the data 30d occurs. The data transmitting method #1 or the data transmitting method #2, which is a transmitting method same as a transmitting method for the data 30*a* to 30*e*, is applied to the transmission of the health packets.

Figure 9:
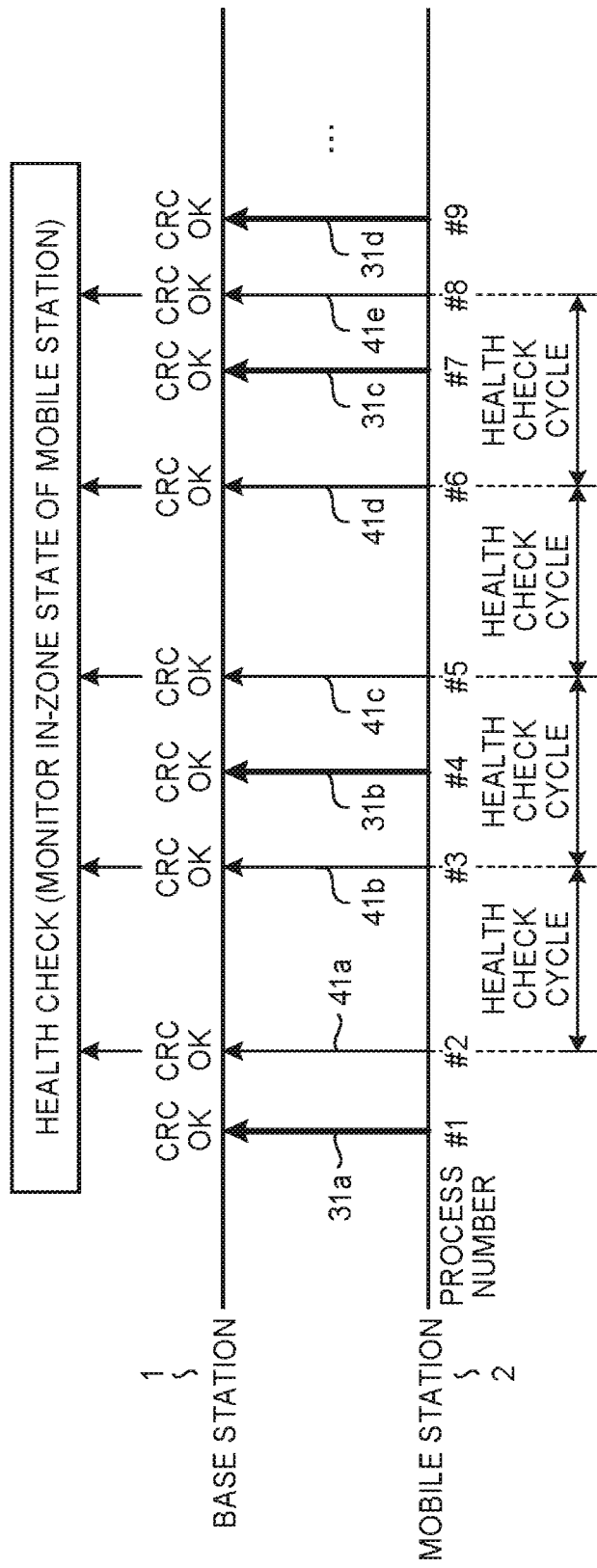
FIG. 9 is a diagram showing an operation performed when the data transmitting method shown in FIG. 1 or FIG. 2 according to the embodiment is applied and the health check is performed independently from data transmission.

In FIG. 8, not only the health check packets but also all received data are used for the health check. However, the health check can be performed independently from the data transmission. FIG. 9 is a diagram showing an operation in performing the health check independently from the data transmission. When the health check is performed independently from the data transmission, as shown in FIG. 9, by receiving health check packets 41*a* to 41*e* in parallel to data 31*a* to 31*d*, the base station 1 performs the health check of the mobile station 2. The base station 1 uses only the health check packets 41*a* to 41*e* without using the data 31*a* to 31*d*.

In this embodiment, when the data transmitting method #3 is applied, the health check explained with reference to FIG. 8 and FIG. 9 is stopped and a health check effect obtained by the data transmitting method #3 is used. That is, switching of a health check method is performed according to a data transmitting method.

The health check performed when the data transmitting method #3 is applied is as explained with reference to FIG. 3 or FIG. 4. At this point, the QoS setting table 17 shown in FIG. 5 is created by both of the base station 1 and the mobile station 2 during connection or during addition of communication. Therefore, it is possible to determine not only on a transmission side but also on a reception side whether the data transmitting method #3 is used. Therefore, as explained with reference to FIG. 3, because the health check is performed using high-quality data transmission, it is possible to perform highly reliable maintenance management of a communication connection state.

Note that, in the above explanation, the example is explained in which the mobile station 2 transmits data. However, the same applies when the base station 1 transmits data. The data transmitting method is explained in the example in which combination is performed as in the HARQ. However, ARQ including consecutive transmission can be used without using the combination function.

Like the data transmitting method shown in FIG. 2, the data transmitting method in this embodiment is suitable for data transmission in which a low rate and a real time property are required. However, according to the data transmitting method explained with reference to FIG. 3, it is possible to perform data transmission higher in quality than the data transmitting method shown in FIG. 2. Further, it is possible to perform maintenance management of a communication connection state using high-quality data. Therefore, the data transmitting method is particularly suitable for road-to-vehicle communication and vehicle-to-vehicle communication, which are mobile communication applied to a train or automobile traffic system in which high reliability is required. For example, a radio apparatus mounted on a train or an automobile is equivalent to the mobile station 2. Data of a vehicle state of position information or speed information including information for the base station 1 to detect the position of the mobile station 2 is transmitted to the base station 1 disposed on a road side. When the data transmitting method explained with reference to FIG. 3 is applied to the data transmission in this radio section, it is possible not only to improve data transmission quality of the vehicle state but also to allow the base station 1 to perform health check of the vehicle. Similarly, it is also possible to transmit, in high quality, brake control information or speed increase/decrease control information from the base station 1 to the mobile station 2, which is the vehicle, and allow the mobile station 2 to perform the health check.

Note that the present invention can be also be applied to data communication of not only the control information explained above but also train operation information, automobile navigation information, or expressway billing information.

The configurations of the base station 1 and the mobile station 2 configuring the mobile communication system explained above are briefly explained.

Figure 10:
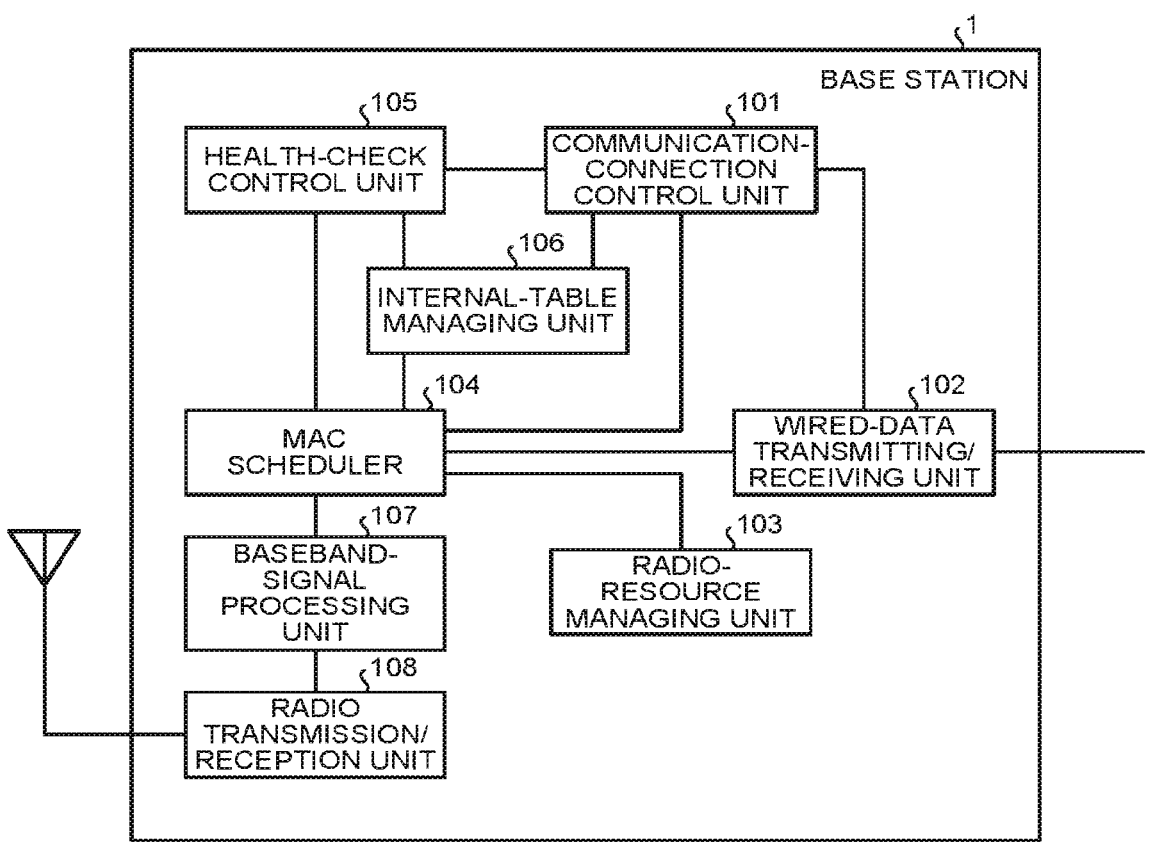
FIG. 10 is a diagram showing an example of the configuration of a base station in a mobile communication system according to the embodiment.

FIG. 10 is a diagram showing an example of the configuration of the base station in the mobile communication system of the present invention. A communication-connection control unit 101 performs, between the host apparatus connected to the base station 1 and the mobile station 2, control for connecting, disconnecting, adding, or deleting communication with the mobile station 2. A wired-data transmitting/receiving unit 102 performs transmission and reception of control information and data to and from the host apparatus via a network. A radio-resource managing unit 103 manages radio resources allocated to mobile stations such as time-division time slots and determines a radio resource for a MAC scheduler 104 to transmit and receive data in a radio section. The MAC scheduler 104 manages a HARQ process for performing radio transmission, allocates the HARQ process to transmission data, and performs transmission and reception of data using the radio resource obtained from the radio-resource managing unit 103. The MAC scheduler 104 performs MAC protocol processing for communicating with the mobile station or format conversion into radio data. Radio resource information for transmitting data from the mobile station is notified to the mobile station 2 via the MAC scheduler 104. Note that the MAC scheduler 104 is equivalent to the MAC scheduler 16 shown in FIG. 4. A health-check control unit 105 performs execution and switching of health check corresponding to a data transmitting method and notifies the communication-connection control unit 101 of a communication connection maintenance state of the mobile station 2. An internal-table managing unit 106 manages the tables shown in FIG. 5, FIG. 6, and FIG. 7 on a memory and enables other functional units, for example, the MAC scheduler 104 to access the tables. A baseband-signal processing unit 107 performs modulation/demodulation processing of a radio signal. A radio transmission/reception unit 108 performs transmission and reception of the radio signal. Note that the radio transmission/reception unit 108 includes an antenna as shown in FIG. 10.

Figure 11:
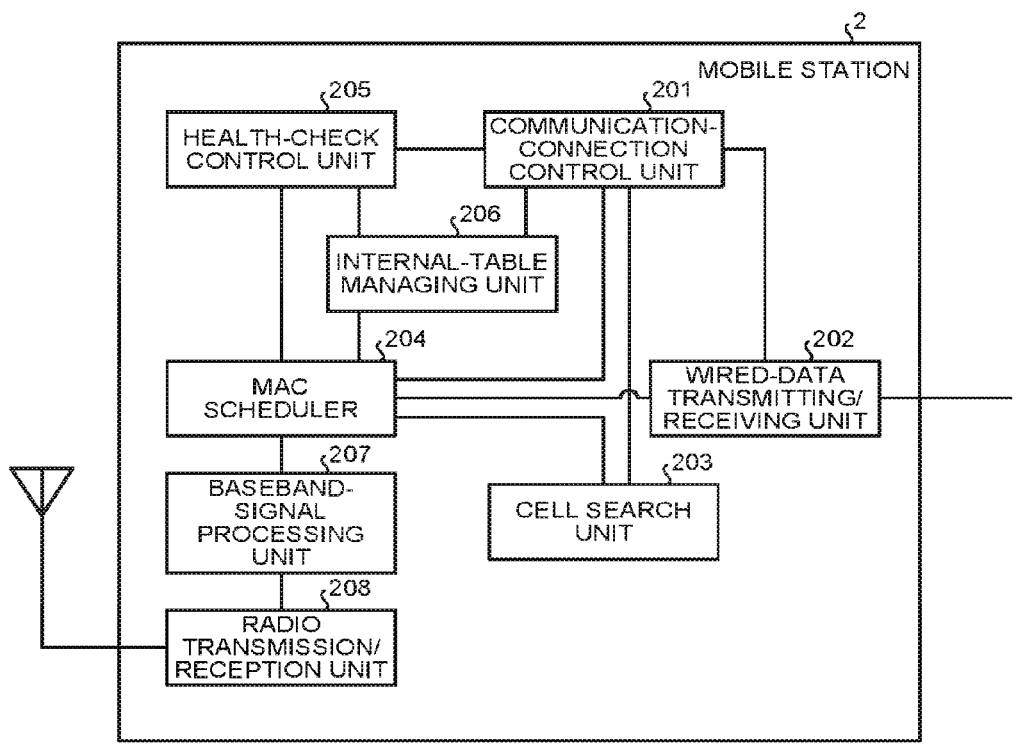
FIG. 11 is a diagram showing an example of the configuration of a mobile station in the mobile communication system according to the embodiment.

FIG. 11 is a diagram showing an example of the configuration of the mobile station in the mobile communication system of the present invention. A communication-connection control unit 201 performs, between an application apparatus, which is an external apparatus connected to the mobile station 2, and the base station 1, control for connecting, disconnecting, adding, or deleting communication. A wired-data transmitting/receiving unit 202 performs transmission and reception of control information and data to and from the external apparatus connected to the mobile station 2. A cell search unit 203 performs reception control of notification information transmitted by the base station 1 and determines a base station that can be present in the zone. Note that the base station that can be present in the zone includes a base station that is a handover candidate. A MAC scheduler 204 requests the base station 1 to allocate radio resources for the mobile station 2 to transmit data and performs transmission and reception of the data using the radio resources obtained from the base station 1. The MAC scheduler 204 manages a HARQ process for transmitting the radio resources by radio, allocates the HARQ process to transmission data, and performs MAC protocol processing for communicating with the base station or format conversion into radio data. A health-check control unit 205 performs execution and switching of health check corresponding to a data transmitting method and notifies the communication-connection control unit 201 of a communication connection maintenance state. An internal-table managing unit 206 manages the tables shown in FIG. 5, FIG. 6, and FIG. 7 on a memory and enables other functional units, for example, the MAC scheduler 204 to access the tables. A baseband-signal processing unit 207 performs modulation/demodulation processing of a radio signal. A radio transmission/reception unit 208 performs transmission and reception of the radio signal. Note that the radio transmission/reception unit 208 includes an antenna as shown in FIG. 11.

It is possible to realize the data transmitting method explained in this embodiment by using the base station shown in FIG. 10 and the mobile station shown in FIG. 11 in this way.

Note that the present invention is not limited to the data transmitting apparatus explained in this embodiment. A data receiving apparatus and a data transmitting apparatus applied with the data transmitting method are also included in the present invention. That is, an aspect of the present invention is a data receiving apparatus that receives data transmitted from a data transmitting apparatus by a data transmitting method applied with HARQ. The data receiving apparatus receives data transmitted by the data transmitting apparatus allocating a process, which is a transmission unit of the same data, to new transmission data, cyclically continuing to transmit the same data being transmitted or an error correction code of the same data in a process same as the process until generation of another new transmission data, and allocating, when another new transmission data is generated, the process of the cyclically continued transmission to the other new transmission data and cyclically transmitting the other new transmission data, performs data combination by the HARQ using the received data to normally receive data and detect a data error or data non-reception, and monitors a communication connection state with the data transmitting apparatus using the received data. Another aspect of the present invention is a data transmitting apparatus that transmits data to a data receiving apparatus with a data transmitting method applied with HARQ. The data transmitting apparatus allocates a process, which is a transmission unit of the same data, to new transmission data and transmits the new transmission data, cyclically continues to transmit the same data being transmitted or an error correction code of the same data in a process same as the process until generation of another new transmission data, allocates, when another new transmission data is generated, the process of the cyclically continued transmission to the new transmission data, and cyclically transmits the new transmission data. The transmitted data is normally received by the data receiving apparatus through data combination by the HARQ, a data error or data non-reception is detected, and a communication connection state is monitored by the data receiving apparatus. The data receiving apparatus and the data transmitting apparatus can be adopted as a base station or a mobile station in a mobile communication system.

As explained in this embodiment, the health check can be performed according to transmission and reception data. That is, an aspect of the present invention is a data transmitting/receiving apparatus that performs transmission and reception of data with a logical channel applied with a plurality of logical channels. When the data transmitting method shown in FIG. 3, which is the data transmitting method explained above, is applied to any one of the plurality of logical channels, the data transmitting/receiving apparatus performs the health check using transmission and reception data in the logical channel. When the data transmitting method shown in FIG. 3, which is the data transmitting method explained above, is applied to none of the plurality of logical channels, the data transmitting/receiving apparatus performs the health check using a packet for the health check. Note that a mobile communication system in which the data transmitting/receiving apparatus is adopted as a mobile station or a base station is also included in the present invention.

As explained above, according to this embodiment, it is possible to prevent, without causing a connection delay, control of a mobile station from being disabled.

INDUSTRIAL APPLICABILITY

As explained above, the data transmitting method according to the present invention is useful for a communication system in which a mobile station is controlled by a base station and is particularly suitable for road-to-vehicle communication and vehicle-to-vehicle communication.

REFERENCE SIGNS LIST 1 base station
2 mobile station
3a 4a, 5a, 9a, 11a, 20a, 20b, 21a, 21b, 22a, 22b, 30a, 30b, 30c, 30d, 30e, 31a, 31b, 31c, 31d data
4b retransmission data
9b, 9c, 11b, 11c, 11d, 11e consecutive transmission data
6a, 8a, 10b, 10c, 12b, 12c, 12d, 12x, 14a ACK response
7a, 10a, 12a NACK response
13a, 13b new data
15a logical channel #0
15b logical channel #1
16, 104, 204 MAC scheduler
17 QoS setting table
18 process correspondence table
19 process state table
40a, 40b, 41a, 41b, 41c, 41d, 41e health check packet
101, 201 communication-connection control unit
102, 202 wired-data transmitting/receiving unit
103 radio-resource managing unit
105, 205 health-check control unit
106, 206 internal-table managing unit
107, 207 baseband-signal processing unit
108, 208 radio transmission/reception unit
203 cell search unit

The invention claimed is:

1. A data transmitting method applied with HARQ for transmitting data from a data transmission device to a data reception device, the method comprising:
   allocating, by the data transmission device, a process, which is a transmission unit of same data, to new transmission data;
   transmitting, by the data transmission device, the new transmission data;
   continuing, by the data transmission device, to cyclically retransmit, without waiting for acknowledgment from the data reception device, the same data of the new transmission data or an error correction code of the same data in the same process until generation of another new transmission data;

allocating, by the data transmission device, when another new transmission data is generated, the process of the cyclically continued retransmission to the other new transmission data;

cyclically retransmitting, by the data transmission device, the other new transmission data without waiting for acknowledgement from the data reception device; and performing, by the data reception device, data combination by the HARQ using the received data to normally receive data and detect a data error or data non-reception and monitoring a communication connection state with the data transmission side using the received data.

2. The data transmitting method according to claim 1, wherein
 a plurality of logical channels are disposed between the data transmission device and the data reception device and, in the logical channels, a maximum number of processes simultaneously usable for one logical channel is limited, and
 a larger number of simultaneously used processes are allocated to a first logical channel with a high generation frequency of new data than to a second logical channel with a lower generation frequency of new data than the first channel.

3. The data transmitting method according to claim 1, wherein
 a plurality of logical channels are disposed between the data transmission device and the data reception device and, in the logical channels, a maximum number of processes simultaneously usable for one logical channel is limited, and
 a larger number of simultaneously used processes are allocated to a first logical channel in which high reliability of communication connection maintenance is required than to a second change in which high reliability of communication connection is not required.

4. The data transmitting method according to claim 1, wherein a delivery confirmation of the HARQ is not transmitted.

5. A data transmitting/receiving apparatus comprising a transmitter, a receiver, and a processor to perform transmission and reception of data with a logical channel applied with a plurality of logical channels,
 when the data transmitting method according to claim 1 is applied to any one of the plurality of logical channels, the processor of the data transmitting/receiving apparatus performs health check using transmission and reception data in the logical channel, and
 when the data transmitting method according to claim 1 is applied to none of the plurality of logical channels, the processor of the data transmitting/receiving apparatus performs the health check using a packet for the health check.

6. A mobile communication system, wherein
 the data transmitting/receiving apparatus according to claim 5 is a mobile station, and
 the mobile communication system comprises the mobile station and a base station that includes:
  a radio transmitter/receiver configured to receive data transmitted by the mobile station,
  a processor configured to
   perform data combination by the HARQ using the received data to normally receive data and detect a data error or data non-reception, and
   monitor a communication connection state with the mobile station using the received data,
 wherein the mobile station allocates a process, which is a transmission unit of same data, to new transmission data, to cyclically continue to retransmit, without waiting for acknowledgement from the base station, the same data being transmitted or an error correction code of the same data in the same process until generation of another new transmission data, and allocates, when another new transmission data is generated, the process of the cyclically continued retransmission to the other new transmission data and cyclically retransmits the other new transmission data without waiting for acknowledgement from the base station.

7. A mobile communication system, wherein
 the data transmitting/receiving apparatus according to claim 5 is a base station, and
 the mobile communication system comprises the base station and a mobile station that includes:
  a processor configured to
   allocate a process, which is a transmission unit of same data, to new transmission data and to transmit the new transmission data,
   cyclically retransmit, without waiting for acknowledgment from the base station, the same data being transmitted or an error correction code of the same data in the same process until generation of another new transmission data,
   allocate, when another new transmission data is generated, the process of the cyclically continued retransmission to the new transmission data, and
   cyclically retransmit the new transmission data without waiting for acknowledgement from the base station,
  wherein the transmitted data is normally received by the base station through data combination by the HARQ, a data error or data non-reception is detected, and a communication connection state is monitored by the base station.

8. A data receiving apparatus that receives data transmitted from a data transmitting apparatus by a data transmitting method applied with HARQ, the data receiving apparatus comprising:
 a radio transmitter/receiver configured to receive data transmitted by the data transmitting apparatus;
 a processor configured to
  perform data combination by the HARQ using the received data to normally receive data and detect a data error or data non-reception, and
  monitor a communication connection state with the data transmitting apparatus using the received data,
  wherein the data transmitting apparatus allocates a process, which is a transmission unit of same data, to new transmission data, to cyclically continue to retransmit, without waiting for an acknowledgment from the data receiving apparatus, the same data being transmitted or an error correction code of the same data in the same process until generation of another new transmission data, and allocates, when another new transmission data is generated, the process of the cyclically continued retransmission to the other new transmission data and cyclically retransmits the other new transmission data without waiting for acknowledgement from the data receiving apparatus.

9. A base station, the base station being the data receiving apparatus according to claim 8.

10. A mobile station, the mobile station being the data receiving apparatus according to claim 8.

11. A data transmitting apparatus that transmits data to a data receiving apparatus with a data transmitting method applied with HARQ, the data transmitting apparatus comprising:
- a processor configured to
    - allocate a process, which is a transmission unit of same data, to new transmission data and to transmit the new transmission data,
    - cyclically retransmit, without waiting for acknowledgement from the data receiving apparatus, the same data being transmitted or an error correction code of the same data in the same process until generation of another new transmission data,
    - allocate, when another new transmission data is generated, the process of the cyclically continued retransmission to the new transmission data, and
    - cyclically retransmit, without waiting for acknowledgement from the data receiving apparatus, the new transmission data, wherein
- the transmitted data is normally received by the data receiving apparatus through data combination by the HARQ, a data error or data non-reception is detected, and a communication connection state is monitored by the data receiving apparatus.

12. A base station, the base station being the data transmitting apparatus according to claim 11.

13. A mobile station, the mobile station being the data transmitting apparatus according to claim 11.

* * * * *